United States Patent
Hassan et al.

(10) Patent No.: US 12,278,828 B2
(45) Date of Patent: *Apr. 15, 2025

(54) SYSTEM FOR DETECTING WEB PAGE FRAUD BASED ON WORDLIST CATEGORIZATION

(71) Applicant: KING FAHD UNIVERSITY OF PETROLEUM AND MINERALS, Dhahran (SA)

(72) Inventors: Md. Rafiul Hassan, Dhahran (SA); Muhammad Imtiaz Hossain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,090

(22) Filed: Jul. 10, 2024

(65) Prior Publication Data

US 2024/0364719 A1  Oct. 31, 2024

Related U.S. Application Data

(63) Continuation of application No. 17/510,458, filed on Oct. 26, 2021, now Pat. No. 12,095,781.

(51) Int. Cl.
*H04L 29/06* (2006.01)
*G06N 20/00* (2019.01)
*H04L 9/40* (2022.01)

(52) U.S. Cl.
CPC ......... *H04L 63/1416* (2013.01); *G06N 20/00* (2019.01)

(58) Field of Classification Search
CPC . H04L 63/1416; H04L 67/54; H04L 41/0253; H04L 41/0273; H04L 41/0286;
(Continued)

(56) References Cited

U.S. PATENT DOCUMENTS

| 11,277,437 | B1 | 3/2022 | Burgis | |
|---|---|---|---|---|
| 2013/0138428 | A1* | 5/2013 | Chandramouli | .... H04L 63/1416 704/9 |

(Continued)

FOREIGN PATENT DOCUMENTS

| CN | 102487293 B | 9/2014 |
|---|---|---|
| CN | 107169512 A | 9/2017 |
| CN | 109299783 A | 2/2019 |

OTHER PUBLICATIONS

Yang Liu, et al., "A study in machine learning from imbalanced data for sentence boundary detection in speech", Computer Speech and Language, vol. 20, 2006, pp. 468-494.

(Continued)

*Primary Examiner* — Joseph P Hirl
*Assistant Examiner* — Leynna Truvan
(74) *Attorney, Agent, or Firm* — Oblon, McClelland, Maier & Neustadt, L.L.P.

(57) ABSTRACT

A hybrid Hidden Markov Model (HMM) and Machine Learning (ML) systems and apparatus for classification in the case of data instances with imbalanced class distribution, including a Hidden Markov Model for generating a log-likelihood score for each data instance. Implementations of the hybrid system and method detect fraudulent activity and classifies documents with accuracy that surpasses conventional classifiers. In one implementation, Hidden Markov Model (HMM) for generating a log-likelihood score based on an attribute value vector for a set of keyword features characterizing a Web page. In one implementation, the HMM generates a log-likelihood score based on an attribute value vector for page layout characterizing a document image. Resulting attribute value vectors are ranked and divided into bins grouped by log-likelihood scores within equal ranges. Various machine learning models are trained (Continued)

using the balanced vectors obtained by accumulating from all the bins of vectors.

5 Claims, 7 Drawing Sheets

(58) Field of Classification Search
CPC . H04L 41/0293; H04L 63/1483; H04L 67/02; G06N 20/00; G06N 5/01; G06N 7/01; G06N 20/10; G06N 3/091; G06N 3/098; G06E 1/045; G06F 9/38875; G06F 17/16; G06F 2212/454; G06F 30/27; G06F 16/337; G06F 18/2155; G06F 18/217; G06F 16/335; G06F 16/80; G06F 16/88; G06F 16/903; G06F 2221/2119; G05B 2219/14067; G05B 2219/32329; G05B 2219/33034; G05B 2219/33321; G05B 2219/34082; G05B 2219/36039; G05B 2219/40408; G05B 2219/34038; G06Q 20/389; G06Q 30/0218; G06Q 20/4016; G03F 7/706841; G05D 2101/15; G05D 1/0221; G06V 10/70; G06V 10/778; G06V 30/19167; G16B 40/00; G16C 20/70; G06T 2211/441; G08G 1/096888; G01F 15/007; G01G 23/017; H04M 7/0078; H04M 15/47; H04M 2215/0148; H04Q 2213/13139; H04W 12/12; G01N 2021/8927

See application file for complete search history.

(56) References Cited

U.S. PATENT DOCUMENTS

| | | |
|---|---|---|
| 2017/0103267 A1 | 4/2017 | Mishra |
| 2019/0311114 A1 | 10/2019 | Mei |
| 2020/0184278 A1* | 6/2020 | Zadeh .............. G06N 3/044 |
| 2022/0250641 A1 | 8/2022 | Seegmiller |

OTHER PUBLICATIONS

László Tóth, et al., "Training HMM/ANN Hybrid Speech Recognizers by Probabilistic Sampling", International Conference on Artificial Neural Networks, Artificial Neural Networks: Biological Inspirations—ICANN, 2005, pp. 597-603.

* cited by examiner

SYSTEM FOR DETECTING WEB PAGE FRAUD BASED ON WORDLIST CATEGORIZATION

CROSS-REFERENCE TO RELATED APPLICATIONS

The present application is a Continuation of U.S. application Ser. No. 17/510,458, now allowed, having a filing date of Oct. 26, 2021.

BACKGROUND

Technical Field

The present disclosure is directed to a method, system, apparatus and computer program product for classification of imbalanced data with imbalanced class distribution where data samples from one class are far fewer than another class or classes. The present disclosure uses a hidden Markov model log-likelihood ranking of data instances to select sparsely distributed groups of data samples.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the area of pattern classification, data items are identified as being members of one class among several classes. In this disclosure, classification is defined as a process of classifying data samples according to shared features. Classifying is defined as the act of arranging data items into classes. Classifying may also be referred to as predicting a class that data items belong to. A class is defined as a set or category of data items having some feature or features in common and differentiated from from other data items by values of the feature or features. In this disclosure, data items may be images, documents, or other computer readable format.

Typically, a set of data items, also referred to herein as examples or samples, may be characterized by a set of features and pattern classification is used to determine which class a data item would be grouped into based on values of the set of features. For example, images may all have a feature of whether they include the color red. In such case, the images may be grouped into a class containing images that include the color red and another class containing images that do not include the color red. In other words, a class may be defined in terms of values of a set of features. At a higher level, an image of a cat may have several features that identify a cat. In such case, a class may be defined in terms of values of features that characterize a cat. Provided a set of data containing images, the images may be grouped into a class containing images having values of features that identify a cat and into another class or classes for images having values of features that indicate absence of a cat. In other cases, the set of features may be used to identify different animals, rather than a single animal such as a cat. Thus, pattern classification is defined as assignment of data items into a class among possible classes.

In performing classification, there may be cases where one class has a far greater number of examples than the number of examples in other classes due to imbalanced data samples. For example, when predicting between two classes where a first class has substantially greater number of samples than a second class, relatively high accuracy may be achieved by simply predicting that the outcome will be the first class in every instance regardless of the values of the input attributes. It may be very difficult to develop a prediction model that achieves higher accuracy in prediction. As an example, suppose 99% of data samples are for the first class and only 1% of the data samples are for the second class. It may be very difficult to come up with a prediction model that achieves better than 99% accuracy. Part of the reason for the difficulty is that such a prediction model would involve some errors in classifying the data samples. As a practical example, the 1% data samples may be for a natural disaster such as a volcanic eruption, earthquake, or flood. It would be difficult to predict the occurrence of a natural disaster provided that 99% of the data samples are not for natural disasters.

The classification problem in the case of highly imbalanced data is further compounded when the data set is very large and/or skewed. Very large data sets have a problem that larger discrepancies exist between classes of data samples. Sampling methods to reduce the level of imbalance have been explored in several studies but their classification performance is still inadequate.

Sampling methods that have been explored include random downsampling, oversampling using replication, ensample downsampling, and oversampling using synthetic samples. In particular, a random downsampling method randomly downsamples the majority class to equate the number of minority and majority class samples. Since this method uses only a subset of majority class samples, it may result in poorer performance for the majority class. An oversampling using replication method replicates the minority class samples to equate the number of minority and majority class samples. All of the majority class samples are preserved; however, the minority class samples are replicated multiple times. If some of these are bad samples of the minority class, their addition can lead to poorer performance for the minority class. An ensemble downsampling method splits the majority class into N subsets, each with roughly the same number of samples as the minority class. An oversampling using synthetic samples method (Synthetic Minority Oversampling Technique 'SMOTE') generates synthetic minority class samples rather than replicating existing samples. Synthetic samples are generated in the neighborhood of the existing minority class examples. The synthetic samples can potentially cause a classifier to create larger and less specific decision regions, which can potentially generalize better on the testing set than simple oversampling with replication.

Another approach is to train a training algorithm on different random subsets of training samples. The bagging method trains classifiers with different samples of a training set. The bagging method then combines the classifiers trained from different samples given the training set. In particular, to maintain a fixed class distribution, each class may be sampled separately to generate T sets of samples. Each set of samples are used to train T classifiers. A final classifier is built from the T classifiers.

Although various sampling methods and the bagging method help to improve classification performance, there is still room for improvement in classification accuracy.

Imbalanced data distribution can take many forms. For example, an imbalanced data distribution may be found in the case of detection of sentence boundaries. Sentence boundaries in conversational speech are about 13% of all interwork boundaries. The sentence boundaries in broadcast news are about 8% of all interwork boundaries. Furthermore, in spoken language such as in conversational speech, a sentence is not as well defined as in written text and thus requires special processing for determination of sentence boundaries.

One approach to performing detection of sentence boundaries has been proposed which uses a hidden Markov model (HMM) system that uses both prosodic and textual information. The prosodic information represents patterns of stress and intonation in a language, such as rhythm and melody of speech. Since there are many more non-sentence boundaries than sentence boundaries in the data, the prosody model must be constructed to effectively learn from the imbalanced data distribution.

A detection system for detecting sentence boundaries has three components: the prosody model, the hidden event language model (LM), and the HMM method for combining these two models. The goal of the prosody model in the sentence-like unit (SU) detection task is to determine the class membership (SU and not-SU) for each word boundary using the prosodic features. In the proposed system, the prosody model is implemented as a decision tree classifier. The goal of the LM is to model the structural information contained in a word sequence. Posterior probabilities at an interwork boundary are determined from both the prosody model and the hidden event LM. The models are combined using the HMM method.

It is one object of the present disclosure to describe a system and method for classifying data samples having a highly imbalanced class distribution where data samples from one class are far fewer than the other class. An aspect is to compute a log-likelihood score for observations for a hidden markov model, rank the data samples. The range of log-likelihood scores are divided into bins of equal range. Data samples having similar scores are placed into each bin.

SUMMARY

In an aspect, a system for detection of fraudulent activity, includes processing circuitry configured to perform a Hidden Markov Model (HMM) for generating a log-likelihood score based on an attribute value vector for a set of keyword features characterizing a Web page, rank log-likelihood scores generated by the HMM based on a plurality of attribute value vectors for a plurality of Web pages, divide the plurality of attribute value vectors into a predetermined number of bins, wherein the attribute value vectors in each bin are grouped by log-likelihood scores within equal ranges, apply a one-sided sampling technique on each bin of the predetermined number of bins in order to prune redundant and borderline attribute value vectors of the attribute value vectors in the respective bin and obtain a balanced training dataset, train a machine learning classifier using the respective balanced training dataset, and detect fraudulent activity in Web pages using the trained machine learning classifier.

In another aspect, a system for classifying document images, includes processing circuitry configured to perform a Hidden Markov Model (HMM) for generating a log-likelihood score based on an attribute value vector for page layout characterizing a document image, rank log-likelihood scores generated by the HMM based on a plurality of attribute value vectors for a plurality of document images, divide the plurality of attribute value vectors into a predetermined number of bins, wherein the attribute value vectors in each bin are grouped by log-likelihood scores within equal ranges, apply a one-sided sampling technique on each bin of the predetermined number of bins in order to prune redundant and borderline attribute value vectors of the attribute value vectors in the respective bin and obtain a balanced training dataset, train a machine learning classifier using the respective balanced training dataset, and classify document images using the trained machine learning classifiers.

In another aspect, a method of detection of fraudulent activity, includes generating, by processing circuitry performing a Hidden Markov Model (HMM), a log-likelihood score based on an attribute value vector for a set of keyword features characterizing a Web page; ranking, by the processing circuitry, log-likelihood scores generated by the HMM based on a plurality of attribute value vectors for a plurality of Web pages; dividing, by the processing circuitry, the plurality of attribute value vectors into a predetermined number of bins, wherein the attribute value vectors in each bin are grouped by log-likelihood scores within equal ranges; applying, by the processing circuitry, a one-sided sampling technique on each bin of the predetermined number of bins in order to prune redundant and borderline attribute value vectors of the attribute value vectors in the respective bin and obtain a balanced sampled attribute value vectors; training, by the processing circuitry, a machine learning classifier for the balanced sampled attribute value vectors; and detecting, by the processing circuitry, fraudulent activity in Web pages using the trained machine learning classifier.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
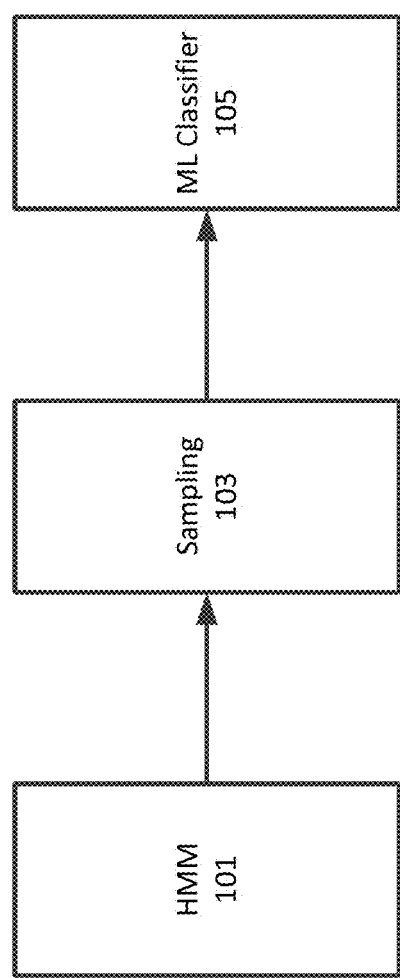
FIG. 1 is a high-level diagram of a classification system in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the term "substantially" generally refers to ranges that include the identified value within a margin of 20%, 10%, or preferably 5%, and any values between 5% and 20%.

Aspects of this disclosure are directed to a method, system, apparatus and computer program product for classifying data samples having imbalanced class distribution. The disclosure is applicable to machine learning for classification. Among other things, the disclosure applicable to classifying whether web browsing actions indicate fraudulent activity, satellite image classification, forest cover type classification, document classification, and detection of sentence boundaries in speech.

Imbalanced data with imbalanced class distribution relates to a case where the number of data samples from one class are far fewer than the number of data samples in another class or other classes. For example, in the case of two classes, the number of data samples available in the first class may be 99 samples, whereas the number of data samples available in the second class may be 1 sample. In this case, the data is highly imbalanced because of the large discrepancy between the two classes. In statistics, imbalanced data is a problem when it comes to classifying new data items because there are so few data samples that would be used to characterize the class. In pattern recognition, there are many situations where imbalanced data is a problem. In classifying whether a web browsing behavior indicates fraudulent activity, most web browsing behavior is regular whereas fraudulent activity will be rare. In satellite image classification, there may be several classes where some classes may have sparse data. In classification of forest cover type the classification is performed based on the types and coverage of tree species. Similar to satellite image classification, some forest cover types may be difficult to distinguish due to their assortment of tree species and range of predictive variable values such as elevation, while some forest cover types may be more unique due to low elevation range and species composition. Classification of documents consists of classifying all the blocks of a page layout of a document that has been detected by a segmentation process. In other words, documents are classified based on page layout structure.

Thus, imbalanced data includes cases where the class of interest has a very small number of samples relative to the total number of samples. Imbalanced data can also include cases where some classes among multiple classes have sparse samples. In some cases there may be a large number of multiple classes (e.g., greater than 10 classes) where there may not be enough data representative of such a large number of classes. Imbalanced data can include cases where classes have very similar features and some features may have a small population. There is a need for a classification system and method that can distinguish between classes with high precision when data samples are imbalanced.

In order to achieve high precision classification where data is imbalanced, a classification system is disclosed that uses a Hidden Markov Model (HMMs) for sampling data for training a machine learning classifier. FIG. 1 is a high-level diagram of the classification system. The classification system includes a trained Hidden Markov Model 101. Data observations are ranked by the log-likelihoods from the Hidden Markov Model, which are used to select groups of data samples. A one-sided sampling 103 is applied locally in each of the groups. The sampled data is used to train a machine learning classifier 105. Among possible machine learning models for classification, three machine learning classifiers are disclosed, including: Decision Tree, Support Vector Machine (SVM), and Classification And Regression Trees (CART). Performance of the machine learning models is described below using a number of metrics e.g. Geometric mean (G-mean) and Area Under the Curve (AUC).

Figure 2:
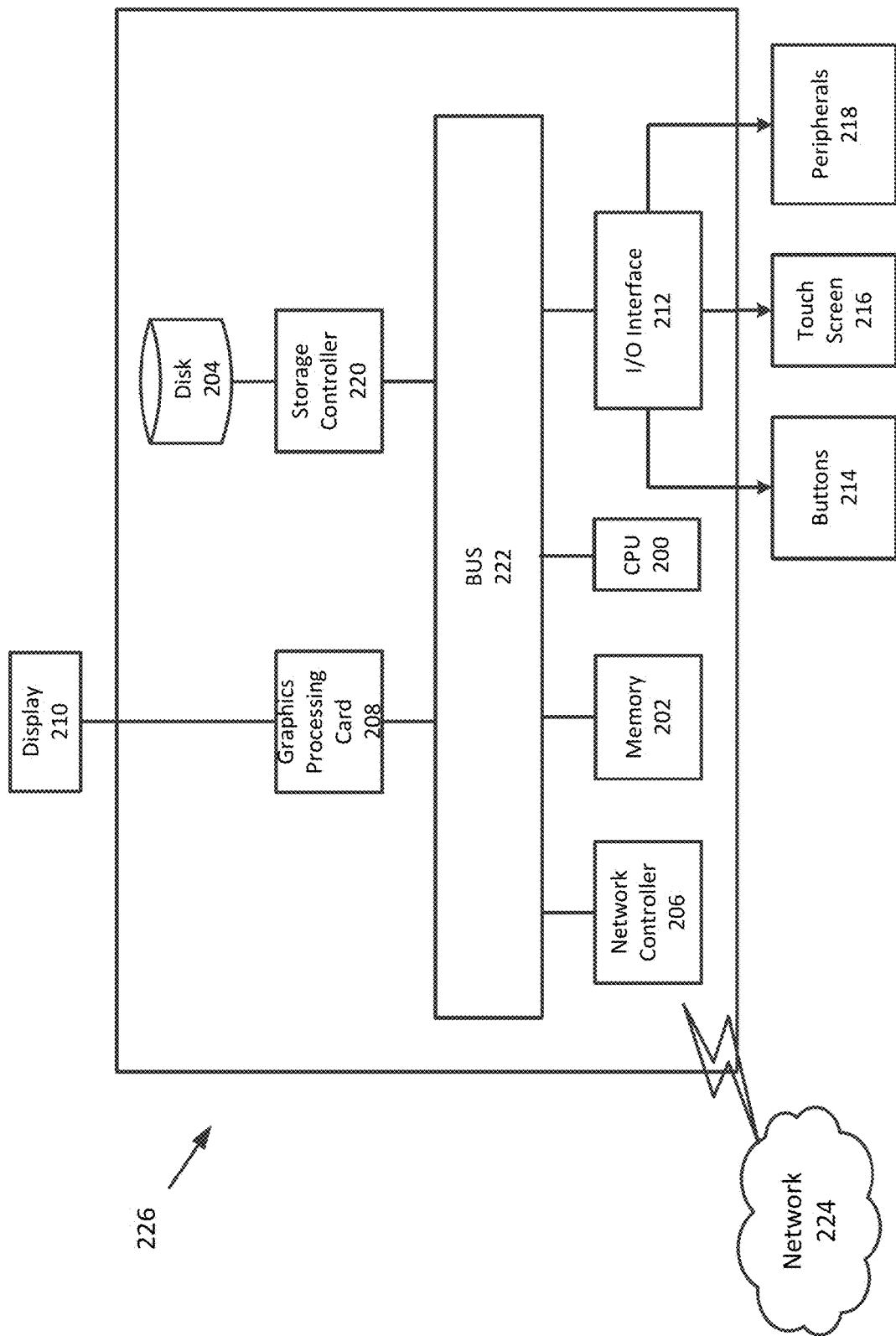
FIG. 2 is a block diagram illustrating an example computer system for implementing the classifier according to an exemplary aspect of the disclosure.

In one implementation, the functions and processes of the Hidden Markov Model and Machine Learning Model may be implemented by a computer 226. Next, a hardware description of the computer 226 according to exemplary embodiments is described with reference to FIG. 2. In FIG. 2, the computer 226 includes a CPU 200 which performs the processes described herein. The process data and instructions may be stored in memory 202. These processes and instructions may also be stored on a storage medium disk 204 such as a hard drive (HDD) or portable storage medium or may be stored remotely. Further, the advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 226 communicates, such as a server or computer.

Further, the claimed advancements may be provided as a utility application, background daemon, or component of an operating system, or combination thereof, executing in conjunction with CPU 200 and an operating system such as Microsoft® Windows®, UNIX®, Oracle® Solaris, LINUX®, Apple macOS® and other systems known to those skilled in the art.

In order to achieve the computer 226, the hardware elements may be realized by various processing circuitry, known to those skilled in the art. For example, CPU 200 may be a Xenon® or Core® processor from Intel Corporation of America or an Opteron® processor from AMD of America, or may be other processor types that would be recognized by one of ordinary skill in the art. Alternatively, the CPU 200 may be implemented on an FPGA, ASIC, PLD or using discrete logic circuits, as one of ordinary skill in the art would recognize. Further, CPU 200 may be implemented as multiple processors cooperatively working in parallel to perform the instructions of the inventive processes described above.

The computer 226 in FIG. 2 also includes a network controller 206, such as an Intel Ethernet PRO network interface card from Intel Corporation of America, for interfacing with network 224. As can be appreciated, the network 224 can be a public network, such as the Internet, or a private network such as LAN or WAN network, or any combination thereof and can also include PSTN or ISDN sub-networks. The network 224 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 226 further includes a graphics processing board 208, such as a NVIDIA® GeForce® GTX or Quadro® graphics adaptor from NVIDIA Corporation of America for interfacing with display 210, such as a Hewlett Packard® HPL2445w LCD monitor. In addition, the graphics processing board 208 provides certain mathematical functions that may be utilized to perform the Hidden Markov Model and the Machine Learning Model.

A general purpose I/O interface 212 interfaces with a keyboard and/or mouse 214 as well as an optional touch screen panel 216 on or separate from display 210. General purpose I/O interface also connects to a variety of peripherals 218 including printers and scanners, such as an OfficeJet® or DeskJet® from Hewlett Packard®.

The general purpose storage controller 220 connects the storage medium disk 204 with communication bus 222, which may be an ISA, EISA, VESA, PCI, or similar, for interconnecting all of the components of the computer 226. A description of the general features and functionality of the display 210, keyboard and/or mouse 214, as well as the display controller 208, storage controller 220, network controller 206, and general purpose I/O interface 212 is omitted herein for brevity as these features are known.

Figure 3:
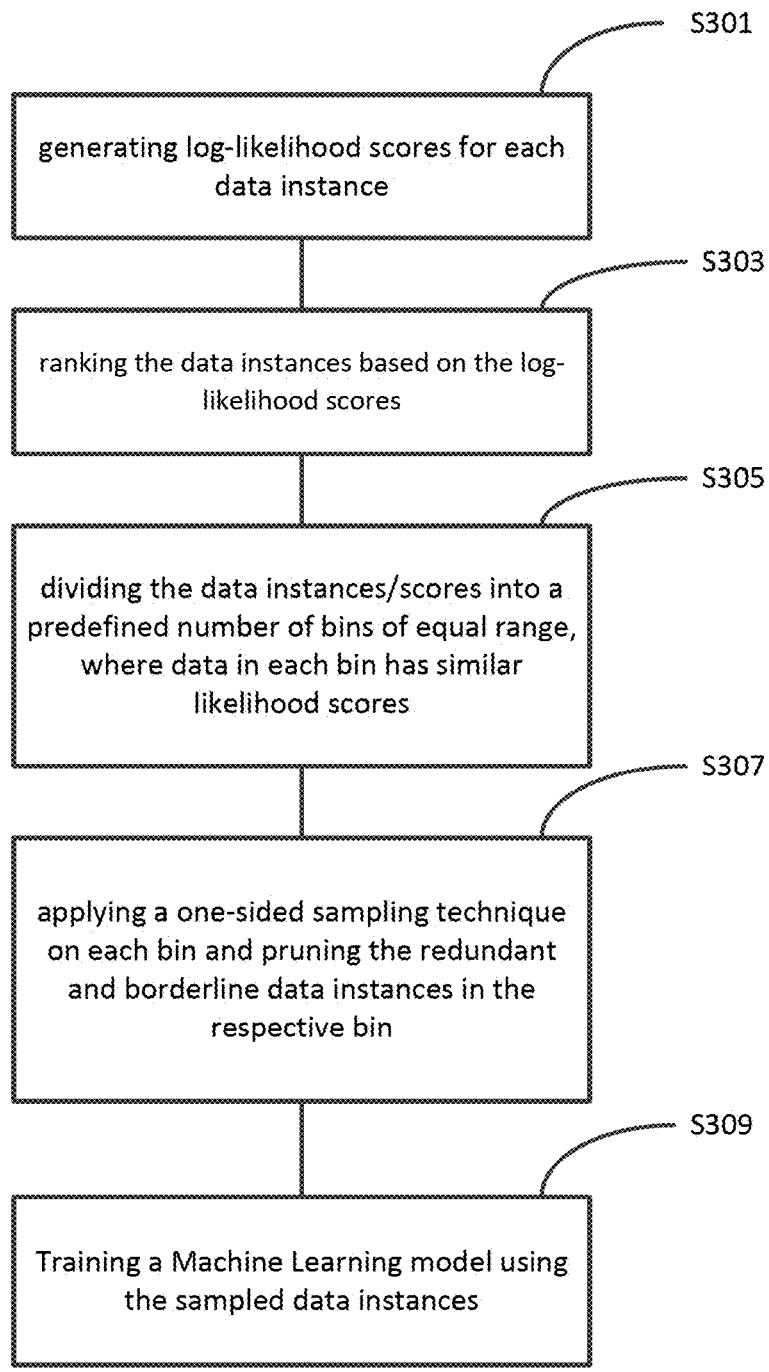
FIG. 3 is a flowchart of the operation of the classifier in accordance with an exemplary aspect of the disclosure.

FIG. 3 is a flowchart of the operation of the classification system. The classification may be performed by processing circuitry, including the computer system of FIG. 2. In some embodiments, the processing circuitry may include specialized hardware devices, such as one or more graphics processing circuit cards. In disclosed embodiments, the Hidden Markov Model is used, in S301, to generate log-likelihood scores for data instances. In S303, the data instances are then ranked based on the log-likelihood scores. In the disclosed embodiments, the data instances are ranked by highest to lowest log-likelihood score. In the embodiments, the log-likelihood is the probability of a sequence of observations-forward procedure.

A Hidden Markov Model is a Markov Model in which the states themselves are hidden (cannot be observed). A Markov Model includes a set of states, in which a series of states is the output of a random process over time, and transitions between states, which are probabilities of transitioning from one state to another state. The Markov Model can be used to determine the probability of a particular sequence of states. The Markov Model estimates the parameters of a transition matrix in order to maximize the likelihood of an observed sequence. The Markov Model learns the parameters of the transition matrix that maximize the log-likelihood of a sequence of observations. See Gagniuc, Paul A., Markov Chains: From Theory to Implementation and Experimentation, John Wiley & Sons, 2017, incorporated herein by reference in its entirety.

In a Hidden Markov Model the values of the states themselves cannot be observed, only an outcome generated by each state would be observed. Also, the Hidden Markov Model includes a probability of generating an output observation as a function of the hidden state. In particular, a Hidden Markov Model is a Markov Model having a series of observed outputs drawn from a set of output values. Similar to the Markov Model, the Hidden Markov Model includes a sequence of states drawn from a set of states and transitions between states.

Figure 4:
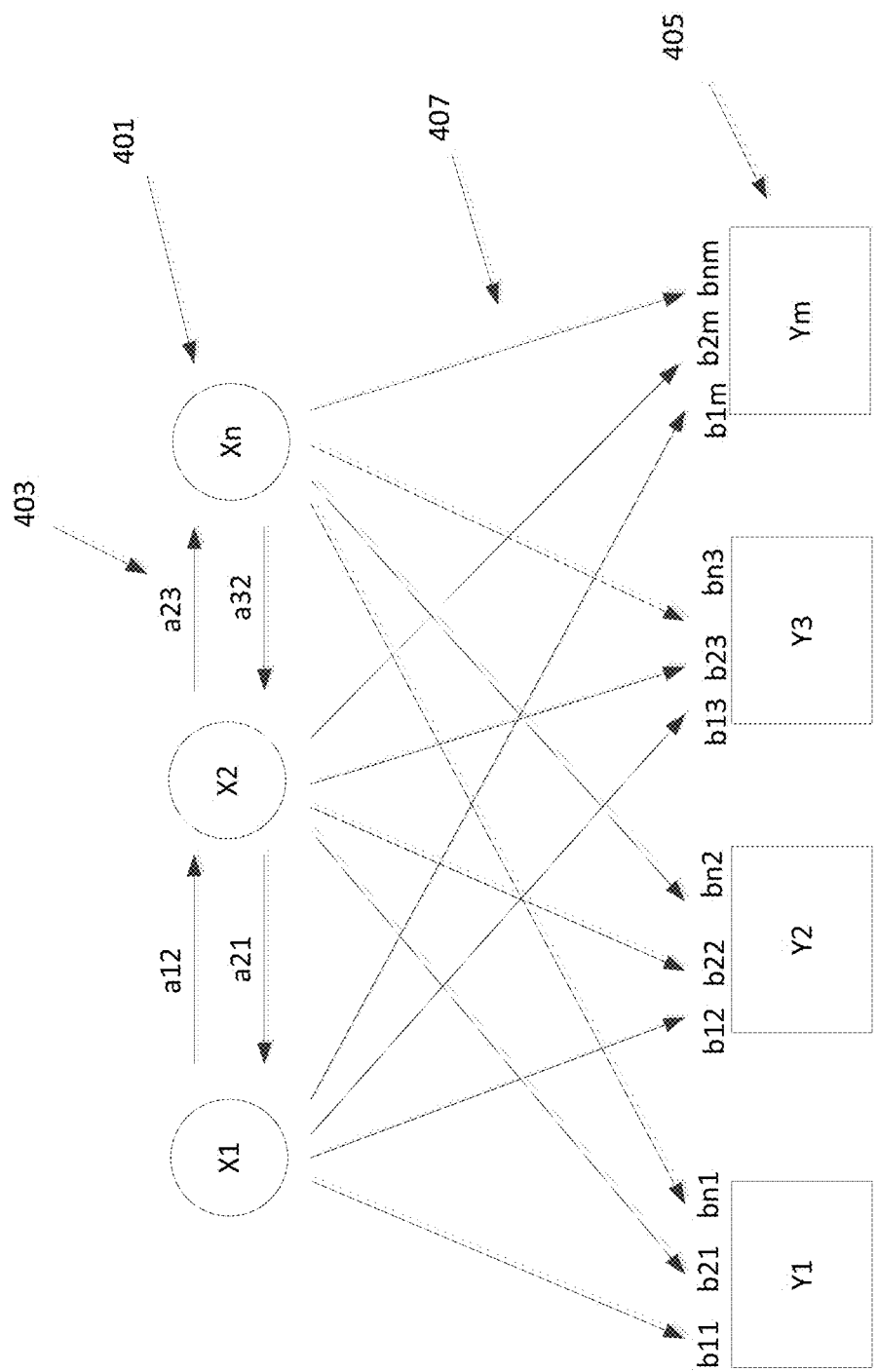
FIG. 4 is a block diagram of a Hidden Markov Model.

FIG. 4 is a block diagram of a Hidden Markov Model for purposes of explaining components that make up the model. An actual Hidden Markov Model will vary in structure depending on the size of the observation data and number of states. The states X1, X2, . . . . Xn 401 in a system are partially visible (hidden). In particular, the values that a state can take and the number of states is known. However, during a Hidden Markov process the particular value of a state at any point is hidden. The value of a state at a point in the process may be estimated, i.e., its log-likelihood may be determined. P(Yn|Xn) is an emission probability or output probability, 'b' 407. Yn are possible observations 405 and 'a' 403 are state transition probabilities.

The Hidden Markov Model may be used in various ways. The Hidden Markov Model may be used to determine the probability of a sequence of observations $Y(t) \in \{Y1, Y2, \ldots Yn\}$ by adding up the likelihood of the data given every possible series of states Xn. The Hidden Markov Model may be used to determine the most likely series of (hidden) states $X(t) \in \{X1, X2, \ldots Xn\}$ given an observed series of outputs Yn. The Hidden Markov Model may be used to determine, given a set of observations $Y(t) \in \{Y1, Y2, \ldots Yn\}$, the values of the state transition probabilities a and the emission probabilities b that make the observations most likely.

Figure 5:
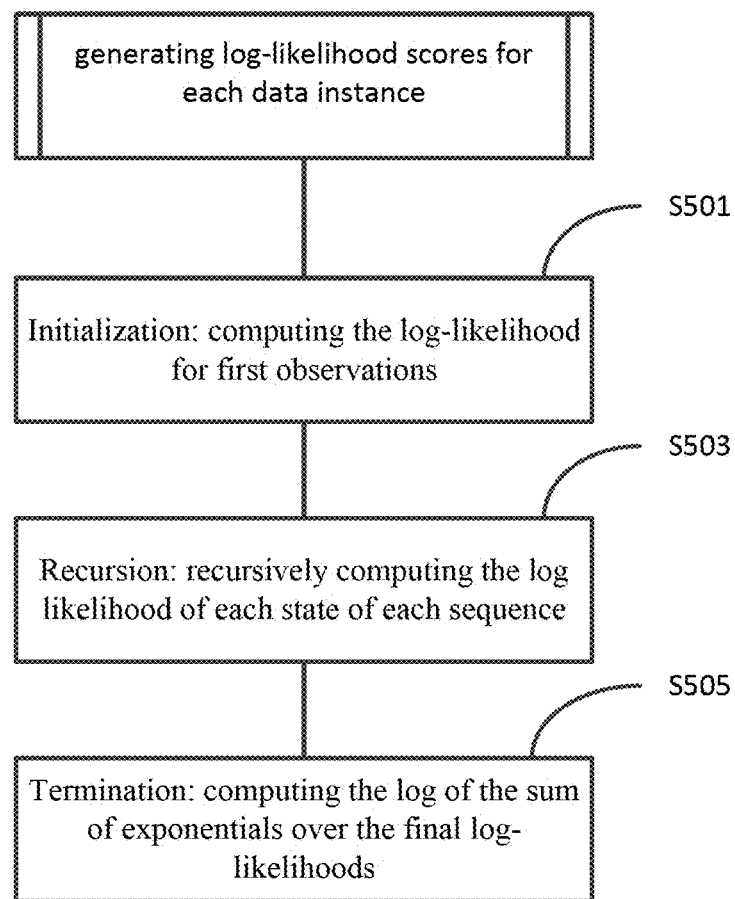
FIG. 5 is a flowchart of a forward algorithm for a Hidden Markov Model in accordance with an exemplary aspect of the disclosure.

The Hidden Markov Model typically determines the probability of a sequence of observations Y1, Y2, . . . Yn using a forward algorithm. FIG. 5 is a flowchart of a forward algorithm for a Hidden Markov model. The forward algorithm includes an initialization step, recursion step and a termination step. In the initialization step, in S501, a forward algorithm includes computing the log-likelihood for first observations as the sum of the log start probabilities and the log-probability of each datum given each state. In an example, a first forward variable is calculated by multiplying the initial probability of state i by the output probability b, also referred to as the emission probability, of that state given the observable O at time 1. For example, a time zero, the start state may have a probability of 1.0 before generating a sequence. The other states may a probability of 0.0.

In the recursion step, in S503, the forward algorithm further includes recursively computing the log probability of each state of each sequence For example, for t=1, 2, . . . , T−1 the forward variable of state j is defined as the product of the previous forward variable of state i, multiplied by the transition probability a between the previous state i to state j, multiplied by the emission probability b from state j to the observable O. In particular, the log probability of each state may be determined as $$f(x_t) = b_x(Y_t) \sum_i f(i-1) a(x(t-1))$$

which includes multiplying $b_x(Y_t)$, the probability of emitting character $Y_t$ from state j, by the summation over the probabilities of being in each state j at i−1 and then transitioning to the current state i. The probability of transitioning from state j to state i is a $(x_{(t-1)})$. In a termination step, in S505, to compute the overall log-likelihood the forward algorithm includes a further step of computing the log sum exp ( ) (Compute the log of the sum of exponentials of input elements) over the final log-likelihoods. This final equation finds the probability of an observation sequence O deriving from an HMM model λ, by summing up all the forward variables at time T, i.e. all the variables of every state at the end of the observation sequence.

In particular, the final probability of the sequence and a (j,o) is the probability of transitioning from state X to the end state.

$$P(y) = \sum_i p(L) a(X, 0)$$

where L is the length of the sequence and a (X,0) is the probability of transitioning from state X to the end state.

In disclosed embodiments, three imbalanced datasets taken from LIBSVM data site and one imbalanced dataset from the UCI Repository were used for purposes of demonstrating the improvement brought about by the disclosed classification system. See C. C. Chang and C. J. Lin. LIBSVM: a library for support vector machines. ACM Transactions on Intelligent Systems and Technology, 2:27:

1-27:27, 2011. [www.csie.ntu.edu.tw/~cjlin/libsvm], which is incorporated herein by reference. See Murphy, P. M. UCI Repository of Machine Learning Databases. Irvine, CA: University of California, Department of Information and Computer Science, 1995. [www.ics.uci.edu/mlearn/MLRepository.html], which is incorporated herein by reference.

Details of the datasets are presented in Table 1. In Table 1 +ve stands for positive class and −ve stands for negative class.

TABLE 1

The input parameters of the dataset and their statistical analysis.

| Dataset | Training Size | Test Size | # of Features | (% + ve, % − ve) in Training Dataset | (% + ve, % − ve) in Test Dataset |
| --- | --- | --- | --- | --- | --- |
| Web | 49,749 | 14951 | 300 | (2.97, 97.03) | (3.04, 96.96) |
| Forest Cover Type | 348,607 | 232,405 | 54 | (3.53, 96.47) | (3.53, 96.47) |
| Sat Image (scaled) | 4,435 | 2,000 | 36 | (9.5, 90.5) | (11.85, 88.15) |
| Page Blocks | 3,830 | 1,642 | 10 | (8.36, 91.64) | (14.56, 85.44) |

Provided these data sets, in an exemplary embodiment, the classification system may be used to classify Web pages. In one embodiment, the classification may be used to classify Web pages into a category, in particular, classify Web pages as fraudulent activity or not. Features of the Web pages may be obtained by extracting 300 binary keyword attributes. An attribute value of 1 is assigned if a Web page contains a certain keyword or phrase, and an attribute value of −1 is assigned if a Web page does not contain the certain keyword or phrase. Phrases or keywords that indicate fraudulent activity may be include "cover up", "illegal", "failed", "not ethical", "under the table," "cash only", "nobody will know", "off the books." and others selected from a fraud indication wordlist, such as the FBI fraud wordlist.

In an exemplary embodiment, the classification system may be used to classify forest cover type. The data set may consist of distinct measurements. In the case of forest cover, there may be overlap between features for different classes and cover type 7 is significantly fewer than the other cover types (1-6). For example, some classes may overlap due to each having a wide range of predictive variable values, such as elevation. Each observation may include the following features:
   Elevation: Elevation in meters
   Aspect: Aspect in degrees azimuth;
   Slope: Slope in degrees;
   Horizontal_Distance_To_Hydrology: Horizontal Distance to nearest surface water features;
   Vertical_Distance_To_Hydrology: Vertical Distance to nearest surface water features;
   Horizontal_Distance_To_Roadways: Horizontal Distance to nearest roadway;
   Hillshade_9 am: Hillshade index at 9 am, summer solstice;
   Hillshade_Noon: Hillshade index at noon, summer solstice;
   Hillshade_3 pm: Hillshade index at 3 pm, summer solstice;
   Horizontal_Distance_To_Fire_Points: Horz Dist to nearest wildfire ignition points
   Wilderness_Area (4 binary columns): Wilderness area designation;
   Soil_Type (40 binary columns): Soil Type designation;
   Forest cover types:
      1—Spruce/Fir
      2—Lodgepole Pine
      3—Ponderosa Pine
      4—Cottonwood/Willow
      5—Aspen
      6—Douglas-fir
      7—Krummholz
   Forest cover type 1-6 are represented as class "−1" and cover type 7 is represented as class "1".

In an exemplary embodiment, the classification system may be used to classify satellite images. The data set may consist of satellite images and each observation is one image. Each observation corresponds to a 3×3 square neighbourhood of pixels completely contained within the 82×100 sub-area. Each line contains the pixel values in the four spectral bands (converted to ASCII) of each of the 9 pixels in the 3×3 neighborhood and a number indicating the classification label of the central pixel. Each observation may include 36 features (4 spectral bands for each 9 pixels of the 3×3 neighborhood) among 7 types of satellite images though there are no examples with type 6 in this dataset. Typically the image type 5 has significantly fewer data samples than the other image types (1-4 and 7).
   Satellite images types:
      1—Red soil
      2—Cotton crop
      3—Grey soil
      4—Damp grey soil
      5—Soil with vegetation stubble
      6—Mixture class (all types present)
      7—Very damp grey soil
   Satellite image type 1-4 and 7 are considered as class "−1" and image type 5 is considered as class "1".

Provided these data sets, in an exemplary embodiment, the classification system may be used to classify documents (Page Blocks). The data set may consist of distinct documents, where each distinct document is a class. A large number of distinct documents may correspond to a large number of classes for classification (e.g., greater than 50 classes). Each observation is for one block of a document. Each observation may include the following 10 features:
   height of the block;
   length of the block;
   area of the block;
   eccentricity of the block (length/height);
   percentage of black pixels within the block;
   percentage of black pixels after the application of the Run Length Smoothing Algorithm (RLSA);
   mean number of white-black transitions;
   total number of black pixels in the original bitmap of the block;
   total number of black pixels in the bitmap of the block after the RLSA; and
   number of white-black transitions in the original bitmap of the block.
   Page blocks types:
      1—Text
      2—Horiz. line
      3—Graphic
      4—Vert. line
      5—Picture
   Page blocks type 1 is considered as class "−1" and blocks types 2-5 are considered as class "1".

These features are used to classify documents based on page layout structure. Because there may be a large number of distinct documents, a large number of data samples would be needed to adequately represent each class. However, typically (page block type 2-5) are insufficiently represented compared to block type 1.

The HMM log-likelihood scores for each of the data observations (instances) are ranked and the data instances are grouped based on the corresponding ranking. In particular, these scores can be used to rank the data instances considering the trained HMM as a reference point. See M. R. Hassan, B. Nath, and M. Kirley. A fusion model of HMM, ANN, and GA for stock market forecasting. Expert Systems with Applications, 33 (1): 171-180, 2007, which is incorporated herein by reference in its entirety. See M. R. Hassan. A combination of hmm and fuzzy model for stock market forecasting. Neurocomputing, 72:3439-3446, 2009, which is incorporated herein by reference in its entirety.

Each data sample from a training dataset is ranked by HMM based log-likelihood score. The range of log-likelihood scores/rank is divided into bins of equal range. The data instances in each bin produce similar or close scores/ranks in terms of log-likelihood. Each bin has a start point and an end point corresponding to the log-likelihood scores. The total number of the bins is a user given parameter to the system.

Next a 'One-sided' sampling technique is employed on each group of data and the redundant and borderline examples are pruned out from the respective group of data.

In one embodiment, an algorithm developed by Kubat & Matwin may be applied to undersize the data in each bin of the training dataset. See M. Kubat and S. Matwin. Addressing the curse of imbalanced training sets: one-sided selection. In Proceedings of the 14th International Conference on Machine Learning, pages 197-186. ICML, 1997, which is incorporated herein by reference in its entirety. To eliminate the border-line instances and the instances suffering from the class-label noise in each of the bins the concept of Tomek may be applied. See I. Tomek. Two Modifications of CNN. IEEE Transactions on Systems, Man and Communications, 6:769-772, 1976, which is incorporated herein by reference in its entirety.

The pseudo-code of the 'One-sided' sampling adopted from Kubat & Matwin is outlined in Algorithm 1.

possible results of the test. Training a Decision Tree classifier uses an algorithm to decide to split a node into two or more sub-nodes.

The ID3 (Iterative Dichotomiser 3) algorithm, for example, builds a decision tree using a top-down greedy search approach through the space of possible branches with no backtracking. FIG. 5 is a flowchart for determining a decision tree in accordance with an exemplary aspect of the disclosure. The ID3 algorithm starts with, in S501, a set of data samples in a root node. On each iteration, in S503, the algorithm iterates through an unused attribute of the set and calculates Entropy and Information Gain of this attribute. In S505, the algorithm then selects the attribute which has the smallest Entropy or largest Information Gain. In S507, the set is then split by the selected attribute to produce a subset of the data. In S509, the algorithm continues to recur on each subset.

Entropy is a measure of the randomness in the information being processed. The higher the entropy, the harder it is to draw any conclusions from that information. Information Gain computes the difference between entropy before split and average entropy after split of the dataset based on given attribute values.

Although a Decision Tree classifier may be used for large data sets, a major problem with a Decision Tree classifier is that a small change in the training data can result in a large change in the tree and consequently the final predictions.

A similar algorithm to the ID3 algorithm is the C4.5 algorithm. The C4.5 algorithm provides some improvements over the ID3 algorithm, including an ability to handle missing attribute values and a procedure for pruning trees.

In particular, at first data samples from a training dataset are ranked based on the log likelihood values obtained from the HMM. The training data samples are distributed among bins of equal ranges based on the log likelihood rank. Data samples belonging to each bin are transformed to a balanced one following Algorithm 1. Finally, the balanced training set from each bin is accumulated to a final balanced data. A Decision Tree classifier is trained for the obtained balanced datasets. During classification of new data instances, a classification label is determined by the corresponding trained Decision Tree classifier.

---

Input: $X_{bin}$: The set of instances in a bin
Output: Y: A data subset obtained after pruning out noisy borderline instances
1 Y ← all the positive instances and randomly select one negative instance from $X_{bin}$;
2 Classify Xbin with the nearest neighbor (1-NN) rule using the instances in Y;
3 Move all the misclassified instances from $X_{bin}$ to Y;
4 Remove all negative instances from Y that satisfies the conditions of Tomek links;
5 Return Y;

---

A number of different classifiers are trained using the balanced training dataset obtained from algorithm 1 to test whether the performance of an individual classifier is enhanced due to the transformation to a balanced data. The classifiers include: Decision Tree, SVM, and CART.

Decision Tree

A Decision Tree classifier is a machine learning model where the target variable can take a discrete set of values. Decision tree classifiers classify examples by sorting them down a tree from the root node to some leaf/terminal node, with the leaf/terminal node providing the classification of the example. Each node performs a test for some attribute, and each edge descending from the node corresponds to Classification and Regression Tree (CART)

Classification and Regression Tree model is a decision tree learning technique that produces a classification tree. A decision tree is formed by a collection of rules based on variables in the training data set. A rule is selected to obtain the best split that differentiates observations based on a dependent variable. Rule selection and node splitting is performed as a recursive procedure that is applied to each child node. Each branch of the decision tree ends in a terminal node. The decision tree may be pruned.

A difference between CART and C4.5 is that CART constructs the tree based on a numerical splitting criterion recursively applied to the data, whereas C4.5 includes the intermediate step of constructing rule sets.

A CART classifier is trained using the balanced dataset and this classifier is used to classify any new/unknown test data sample.

Support Vector Machine (SVM)

A Support Vector Machine (SVM) is a supervised learning technique that can be used to classify data. Unlike a decision tree algorithm like ID3, a SVM involves the solution of a quadratic optimization problem rather than a greedy search. The SVM focuses on support vectors that are data points that lie closest to a decision surface to find an optimal decision surface (hyperplane) to separate the data into classes.

Figure 6:
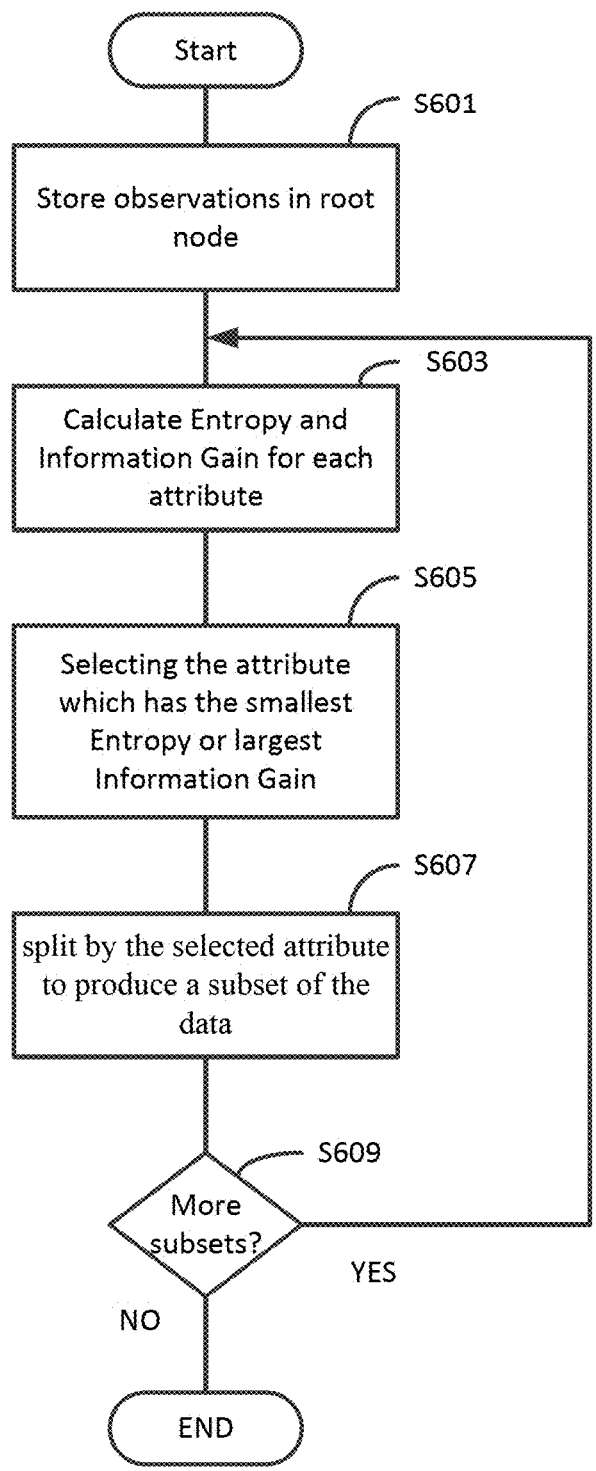
FIG. 6 is a flowchart for determining a decision tree in accordance with an exemplary aspect of the disclosure.
Figure 7:
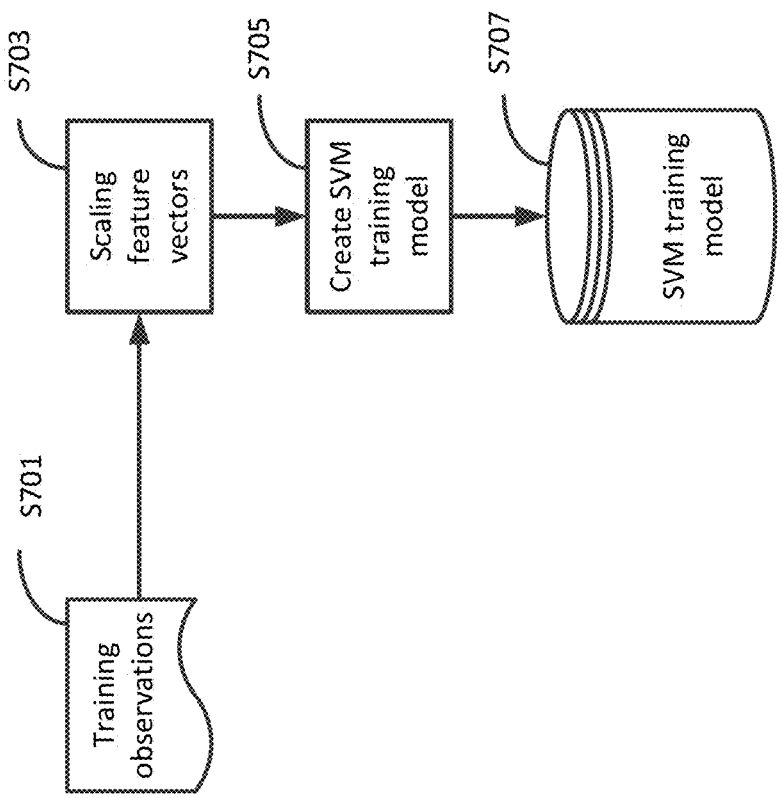
FIG. 7 is a flowchart for determining a Support Vector Machine in accordance with an exemplary aspect of the disclosure.

FIG. 6 is a flowchart for determining a Support Vector Machine in accordance with an exemplary aspect of the disclosure. A SVM may be determined for a set of observations in a bin. In S601, a set of training observations are provided. In some embodiments, in S603, the observations may be scaled (normalized). In S605, a SVM is determined using a sub-gradient descent algorithm. The algorithm determines a decision surface which may be a linear function or a non-linear kernel function. In disclosed embodiments, a publically available software package may be used to implement the SVM. One such software package is scikit-learn. The SVM classification method may take an array of samples and features, and an array of class labels as input. In S607, the resulting SVM classifier is stored in a non-volatile memory.

In the case of multiple classes, the multiclass datasets are made into two class datasets as described in the above in the data sets description.

Individual SVM classifiers is trained for each of the balanced datasets considered (for example, for Pageblock dataset an SVM is built). During classification of new data instances, a classification may be determined by the corresponding trained SVM classifier for the desired dataset.

1. Geometric Mean (G-mean):

A machine learning model may be evaluated using a geometric mean metric. The geometric mean metric is calculated as the geometric mean (G-Mean) of the sensitivity and specificity metrics. Sensitivity is a measure of the proportion of actual positive cases that got predicted as positive (or true positive). Specificity is the proportion of actual negatives, which got predicted as the negative (or true negative).

In general, the geometric mean normalizes the number ranges giving each property equal weight in the average. The higher the G-mean reveals the better classification performance in both sensitivity and specificity. The maximum value of G-mean is 100 (1-100 scale).

$$G\text{-mean} = \sqrt{\text{Sensitivity} \times \text{Specifity}}$$

Area Under the Receiver Operating Characteristics (ROC) Curve (AUC):

AUC has been used as a classification performance metric for imbalanced data in many studies because it is plotted using the True Positive (TP) rate (i.e., Sensitivity) and False Positive (FP) rate (i.e. 1—Specificity) whereby the recognition of positive cases is taken care of, and to achieve a high AUC both the positive class classification, i.e., sensitivity and the negative class classification, i.e., specificity should be high.

Results

TABLE 2

HMM states and number of bins for which the best performance is achieved

| | Classifiers | | | | | |
| | J48 (DT) | | SVM | | CART | |
| Dataset | HMM States | # of Bins | HMM States | # of Bins | HMM States | # of Bins |
|---|---|---|---|---|---|---|
| Web | 5 | 6 | 6 | 6 | 5 | 8 |
| Forest Cover Type | 8 | 10 | 5 | 4 | 6 | 8 |
| Sat Image | 7 | 8 | 8 | 2 | 5 | 10 |
| Page Blocks | 6 | 8 | 8 | 10 | 6 | 8 |

Table 2 lists the values of HMM states and the number of bins for which the best performances were achieved for each classifiers in classifying the 4 datasets. The disclosed HMM-based sampling approach was compared with classification using the SMOTE oversampling and the one-sided under sampling techniques using the three classifiers: Decision Tree, Classification and Regression Tree, and Support Vector Machine. Performance is measured using G-mean and Area Under the Curve.

In the case of a Decision Tree classifier, the G-mean for the forest cover classification using the HMM-based approach for sampling (95.79) was significantly better than the one-sided under sampling approach alone. In all cases, the HMM-based approach for sampling showed an improvement in classification performance over the SMOTE oversampling and the one-sided under sampling techniques.

TABLE 2

Classification performance of Decision Tree for the imbalanced datasets

| | G-Mean | | | | AUC | | | |
|---|---|---|---|---|---|---|---|---|
| Dataset | No Sampling | SMOTE OS | One-Sided US | HMM-based Approach | No Sampling | SMOTE OS | One-Sided US | HMM-based Approach |
| Web | 82.3 | 81.79 | 88.42 | 89.80 *# | 0.88 | 0.92 | 0.937 | 0.95 |
| Forest Cover | 94.63 | 95.4 | 92.52 | 95.79 * | 0.936 | 0.951 | 0.932 | 0.961 |
| Satimage | 85.16 | 91.46 | 90.3 | 92.10 *# | 0.879 | 0.923 | 0.901 | 0.931 |
| Pageblocks | 86.47 | 91.022 | 89.93 | 94.00 *# | 0.847 | 0.885 | 0.911 | 0.958 |

\* Statistically significant difference between the proposed approach and 'One-sided' US
\# Statistically significant difference between the proposed approach and SMOTE

TABLE 3

Classification performance of SVM for the imbalanced datasets

| | G-Mean | | | | AUC | | | |
|---|---|---|---|---|---|---|---|---|
| Dataset | No Sampling | SMOTE OS | One-Sided US | HMM-based Approach | No Sampling | SMOTE OS | One-Sided US | HMM-based Approach |
| Web | 89.03 | 90.83 | 90.79 | 91.35 * | 0.853 | 0.873 | 0.908 | 0.916 |
| Forest Cover | 89.86 | 92.05 | 91.46 | 94.09 * | 0.889 | 0.925 | 0.915 | 0.941 |
| Satimage | 91.61 | 93.15 | 92.82 | 94.0 *# | 0.919 | 0.932 | 0.923 | 0.94 |
| Pageblocks | 85.04 | 86.93 | 86.68 | 88.49 *# | 0.855 | 0.871 | 0.867 | 0.885 |

\* Statistically significant difference between the proposed approach and 'One-sided' US
\# Statistically significant difference between the proposed approach and SMOTE

TABLE 4

Classification performance of CART for the imbalanced datasets

| | G-Mean | | | | AUC | | | |
|---|---|---|---|---|---|---|---|---|
| Dataset | No Sampling | SMOTE OS | One-Sided US | HMM-based Approach | No Sampling | SMOTE OS | One-Sided US | HMM-based Approach |
| Web | 80.15 | 85.23 | 87.03 | 89.16 *# | 0.852 | 0.881 | 0.92 | 0.95 |
| Forest Cover | 92.37 | 93.87 | 92.41 | 94.23 *# | 0.947 | 0.937 | 0.944 | 0.955 |
| Satimage | 81.5 | 89.35 | 83.86 | 90.16 *# | 0.841 | 0.887 | 0.84 | 0.92 |
| Pageblocks | 90.97 | 98.2 | 96.28 | 98.3 | 0.915 | 0.993 | 0.984 | 0.992 |

\* Statistically significant difference between the proposed approach and 'One-sided' US
\# Statistically significant difference between the proposed approach and SMOTE Numerous modifications and variations of the present invention are possible in light of the above teachings. It is therefore to be understood that within the scope of the appended claims, the invention may be practiced otherwise than as specifically described herein.

The invention claimed is:

1. A system for detection of fraudulent activity, including: processing circuitry configured to
   train a machine learning classifier, including
   perform a Hidden Markov Model (HMM) for generating log-likelihood scores based on a plurality of attribute value vectors for one class and attribute value vectors for another class for a set of keyword features characterizing a Web page, wherein the generating includes recursively computing the log-likelihood of each state of each of the attribute value vectors, and wherein there are substantially fewer attribute value vectors in the one class than in the another class,
   rank the log-likelihood scores generated by the HMM,
   group the plurality of attribute value vectors into a predetermined number of bins, wherein the attribute value vectors in each bin are grouped by log-likelihood scores within equal ranges,
   apply a one-sided sampling technique on each bin of the predetermined number of bins in order to remove redundant and borderline attribute value vectors of the attribute value vectors of the another class in the respective bin in order to obtain a balanced training dataset between the one class and the another class in each bin, and
   train the machine learning classifier using the respective balanced training dataset, and
   detect fraudulent activity in Web pages using the trained machine learning classifier,
   wherein detecting fraudulent activity includes categorizing the Web pages based on inclusion of a keyword from a fraud indication wordlist.

2. The system of claim 1, wherein the machine learning classifier is a Support Vector Machine (SVM) classifier.

3. The system of claim 1, wherein the machine learning classifier is a Classification And Regression Tree (CART) classifier.

4. The system of claim 1, wherein the machine learning classifier is a Decision Tree classifier.

5. The system of claim 1, wherein each of the attribute value vectors represents a sequence of keyword features, wherein processing circuitry is configured to determine the log-likelihood score of each data instance based on a probability of the sequence of keyword features.

\* \* \* \* \*